(12) United States Patent
Wang et al.

(10) Patent No.: US 11,917,932 B2
(45) Date of Patent: Mar. 5, 2024

(54) SOIL CONDITIONER SPREADER AND OPERATION METHOD THEREOF

(71) Applicant: INSTITUTE OF AGRICULTURAL RESOURCES AND REGIONAL PLANNING, CHINESE ACADEMY OF AGRICULTURAL SCIENCES, Beijing (CN)

(72) Inventors: Jing Wang, Beijing (CN); Huancheng Pang, Beijing (CN); Yuyi Li, Beijing (CN); Li Zhang, Beijing (CN); Ping Cong, Beijing (CN); Na Liu, Beijing (CN); Hongyuan Zhang, Beijing (CN); Xiaoli Zhang, Beijing (CN)

(73) Assignee: Institute of Agricultural Resources and Regional Planning, Chinese Academy of Agricultural Sciences, Beijing (CN)

( * ) Notice: Subject to any disclaimer, the term of this patent is extended or adjusted under 35 U.S.C. 154(b) by 972 days.

(21) Appl. No.: 16/869,667

(22) Filed: May 8, 2020

(65) Prior Publication Data
US 2020/0352079 A1 Nov. 12, 2020

(30) Foreign Application Priority Data
May 8, 2019 (CN) .......................... 201910380334.9

(51) Int. Cl.
*A01B 49/06* (2006.01)
*A01B 49/02* (2006.01)
(Continued)

(52) U.S. Cl.
CPC .......... *A01B 49/065* (2013.01); *A01B 49/025* (2013.01); *A01C 21/002* (2013.01); *A01G 13/0287* (2013.01); *A01M 7/0042* (2013.01)

(58) Field of Classification Search
CPC ..... A01B 49/065; A01B 49/04; A01B 49/022; A01G 13/0287; A01C 21/002; A01C 23/047; A01M 7/0042
See application file for complete search history.

(56) References Cited

U.S. PATENT DOCUMENTS

| 1,247,135 | A | * | 11/1917 | Monroe et al. | ....... E02F 3/7672 172/799.5 |
| 1,476,263 | A | * | 12/1923 | Martin | .................. E02F 3/7668 172/679 |

(Continued)

FOREIGN PATENT DOCUMENTS

CN 204392810 * 6/2015

*Primary Examiner* — Jessica H Lutz
(74) *Attorney, Agent, or Firm* — Hoffmann & Baron LLP

(57) ABSTRACT

A soil conditioner spreader and an operation method thereof are provided. The soil conditioner spreader includes a spreader body, a ridger, a solid tank, two spiral drills, a rotary tillage wheel and a mulching device, where the spreader body is provided with a hopper in a front part. The hopper stores a conditioner. The solid tank is arranged above the spiral drills. The spreader body is connected to the solid tank through a feeding track. The ridger, the spiral rills, the rotary tillage wheel and the mulching device are successively arranged at the bottom of the spreader body from the rear to the front. The ridger ridges first, and then the spiral drills perform deep plowing, rotary tillage and scarification and apply the conditioner to a ridge. The rotary tillage wheel performs rotary tillage, and a nozzle sprays a nutrient solution or an herbicide/insecticide. Finally, the mulching device mulches.

6 Claims, 2 Drawing Sheets

(51) Int. Cl.
*A01C 21/00* (2006.01)
*A01G 13/02* (2006.01)
*A01M 7/00* (2006.01)

(56) References Cited

U.S. PATENT DOCUMENTS

| | | | | |
|---|---|---|---|---|
| 1,587,625 A * | 6/1926 | Adams | E02F 3/7663 | 172/627 |
| 1,742,799 A * | 1/1930 | Andrew | E02F 3/7663 | 172/191 |
| 1,756,329 A * | 4/1930 | Andrew | E02F 3/7663 | 172/414 |
| 1,807,639 A * | 6/1931 | Stocker | E02F 3/7627 | 172/741 |
| 1,833,878 A * | 11/1931 | Adams | E01C 23/082 | 172/780 |
| 2,128,889 A * | 9/1938 | Allen | E02F 3/7663 | 172/393 |
| 2,142,262 A * | 1/1939 | Beckham | E02F 3/7663 | 404/96 |
| 2,230,704 A * | 2/1941 | Sorensen | E02F 3/7613 | 172/815 |
| 2,668,376 A * | 2/1954 | Briscoe | E02F 5/027 | 37/366 |
| 2,787,846 A * | 4/1957 | Everds | E02F 3/7668 | 172/784 |
| 2,840,971 A * | 7/1958 | Greeson | A01B 21/08 | 172/466 |
| 2,849,809 A * | 9/1958 | Chattin | E02F 3/7663 | 37/372 |
| 2,866,281 A * | 12/1958 | Breaux | E02F 3/7668 | 172/744 |
| 3,043,034 A * | 7/1962 | Kober | E02F 3/7663 | 172/780 |
| 3,063,178 A * | 11/1962 | Purdy | E02F 3/7663 | D15/27 |
| 3,172,218 A * | 3/1965 | Constantin | E02F 3/7668 | 280/444 |
| 3,206,879 A * | 9/1965 | Grover | E02F 5/027 | 37/366 |
| 3,348,323 A * | 10/1967 | Purdy | E02F 3/7668 | 172/417 |
| 3,506,074 A * | 4/1970 | Abbott | E02F 3/7663 | 172/780 |
| 4,491,053 A * | 1/1985 | Bar-Nefy | E02F 3/7613 | 89/36.13 |
| 5,213,165 A * | 5/1993 | Dunn | A01B 31/00 | 172/684.5 |
| 5,775,438 A * | 7/1998 | Confoey | E02F 3/7663 | 172/811 |
| 7,600,576 B2 * | 10/2009 | Gayer | E02F 3/7686 | 172/684.5 |
| D615,562 S * | 5/2010 | Kelly | A01B 21/08 | D15/27 |
| 7,802,383 B2 * | 9/2010 | Dufort | E01H 4/02 | 37/221 |
| 9,371,627 B2 * | 6/2016 | Penner | E02F 3/8152 | |
| 9,982,400 B1 * | 5/2018 | Davis | E01C 19/178 | |
| 10,017,907 B1 * | 7/2018 | Davis | E01C 19/42 | |
| 10,711,432 B2 * | 7/2020 | White | E02F 5/125 | |
| 2005/0173138 A1 * | 8/2005 | Taylor | E02F 3/7622 | 172/799.5 |

* cited by examiner

SOIL CONDITIONER SPREADER AND OPERATION METHOD THEREOF

CROSS-REFERENCE TO RELATED APPLICATIONS

This application claims priority to Chinese Patent Application No. 201910380334.9, filed on May 8, 2019, the disclosure of which is incorporated by reference herein in its entirety for all purposes.

TECHNICAL FIELD

The present invention relates to the technical field of agricultural machinery, and in particular to a soil conditioner spreader and an operation method thereof.

BACKGROUND

China has about 27 million hectares of saline land, which is mainly distributed in the inland areas of the northeast, north and northwest provinces as well as the north of the Yangtze River and coastal areas. In addition, China has a large area of land where secondary soil salinization is present or is prone to occur. Due to the accumulation of a large amount of salt in the saline soil, a series of soil properties have deteriorated. The soil organic matter is destroyed and lost, the nutrients are slowly released, and the trace elements are scarce. The microbial activity in the soil is weak, making the soil sticky and poorly permeable. The strong capillary action aggravates the surface soil salinization. The crop roots are poorly developed due to the salt damage. They lack water and nutrients, thus suffering from "physiological drought" and nutritional deficiencies. The crop growth and development are inhibited, resulting in low yield, poor quality and even death.

Soil conditioning is required before planting crops on saline land. At present, the common practice of conditioning saline land is to spread the conditioner first and then ridge. This method is likely to cause uneven distribution and low utilization of the conditioner, and low soil conditioning efficiency, making the effect of soil fertility increase unsatisfactory.

SUMMARY

An objective of the present invention is to provide a soil conditioner spreader and an operation method thereof. The present invention solves the problems of low utilization and low soil conditioning efficiency of the conditioner.

The present invention provides a soil conditioner spreader, including a spreader body, where the spreader body is provided with a hopper in a middle part; the hopper is used for storing a solid conditioner; the spreader body is provided with a spreader rack in a front part; the spreader rack is provided with a mulching device on a front end; a ridger, a solid application device, two rotary tillage wheels and a liquid application device are successively arranged on the spreader rack from the rear to the front; the application device includes a feeding track, a solid tank and two spiral perforated drills; the two spiral perforated drills are respectively arranged on both sides of the bottom of the spreader rack and also in front of the ridger; the top of the spiral perforated drills extends upward into the solid tank from the bottom of the solid tank; the solid tank is provided with a top opening; both ends of the feeding track are respectively arranged in the hopper and the top opening of the solid tank; the two rotary tillage wheels are respectively arranged on both sides of the bottom of the spreader rack and also in front of the two spiral perforated drills; the liquid application device includes a liquid tank, a connecting pipe and a nozzle; the nozzle is arranged at the bottom of the spreader rack and also between the spiral perforated drills and the mulching device; the liquid tank is located on the spreader rack above the nozzle; top and bottom ends of the connecting pipe are respectively connected with the liquid tank and the nozzle.

Preferably, the ridger includes two ridging wheels and a ridging bar; a side of the ridging wheels is formed into an arc-shaped convex surface; the two ridging wheels are arranged on both ends of the ridging bar; the arc-shaped convex surface of the ridging wheels is arranged on an inner side of the ridger.

Preferably, the spiral perforated drill includes a rotating tube and a rotating convex wall; the rotating tube is a hollow tube; the rotating convex wall is spirally arranged along an outer wall of the rotating tube; a plurality of holes are spaced apart on a wall of the rotating tube.

Preferably, the rotary tillage wheel includes a rotary rod and a plurality of rotary tillage blades; a plurality of rotary tillage blades are circumferentially spaced along the rotary rod; the rotary tillage wheel is suspended on the spreader rack by a suspension arm.

Preferably, the mulching device includes a mulch film clamping groove and a mulch film pressing wheel; the mulch film clamping groove is arranged at the bottom of the front end of the spreader rack; the mulch film clamping groove is used for hanging a whole roll of mulch film; the mulch film pressing wheel is used for compacting an edge of the mulch film.

Preferably, the spreader body is provided with four wheels at the bottom and a cab in a rear part.

The present invention further relates to an operation method of the above-mentioned soil conditioner spreader, including the following steps:

step S1: leveling saline land;

step S2: advancing the spreader body and ridging by the ridger;

step S3: transporting the conditioner in the hopper to the solid tank through the feeding track; discharging the conditioner from the solid tank to the spiral perforated drill; performing, by the spiral perforated drill, deep plowing, rotary tillage and scarification, and applying the conditioner into the soil above a ridge;

step S4: performing rotary tillage on the ridge by the rotary tillage wheel;

step S5: transporting a culture solution of a fungicide or an herbicide/insecticide stored in the liquid tank to the nozzle, and spraying through the nozzle; and step S6: unfolding a head of a whole roll of mulch film hanging on the mulch film clamping groove; laying the mulch film along a ridge surface; flattening the mulch film horizontally by the mulch film pressing wheel against the ground; scraping the soil against an edge of the mulch film to fix the mulch film; advancing the spreader body so that the mulch film is gradually lowered, covering the ridge surface.

The present invention has the following beneficial effects:

The soil conditioner spreader disclosed by the present invention saves the conditioner and improves the soil conditioning efficiency. The ridger ridges first, and then the spiral drills perform deep plowing, rotary tillage and scarification and apply the conditioner to the ridge. The rotary tillage wheel performs rotary tillage, and the nozzle sprays the nutrient solution or the herbicide/insecticide. Finally, the mulching device mulches.

DETAILED DESCRIPTION

Example 1

Example 1 provides a soil conditioner spreader, which is described in detail below.

Figure 1:
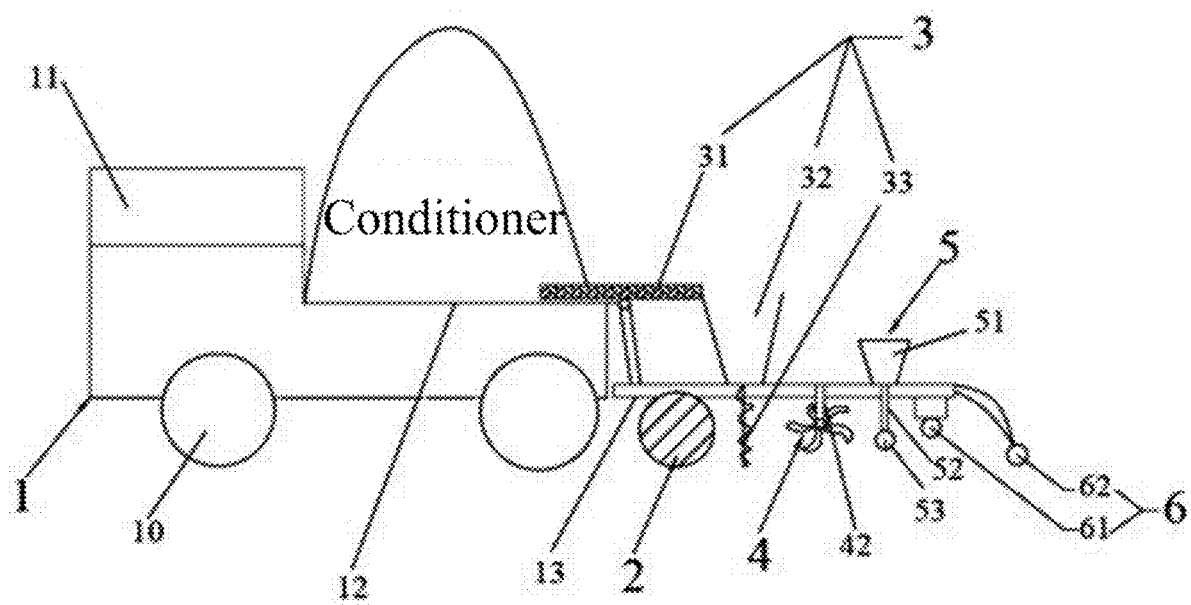
FIG. 1 is a structural diagram of a soil conditioner spreader provided by the present invention.

As shown in FIG. 1, the soil conditioner spreader includes a spreader body 1. The spreader body 1 is provided with four wheels 10 at the bottom, a cab 11 in a rear part and a hopper 12 in a middle part. The hopper 12 is used for storing a solid conditioner. A spreader rack 13 is arranged in a front part of the spreader body 1. The spreader rack 13 is provided with a mulching device 6 on a front end. A ridger 2, a solid application device 3, two rotary tillage wheels 4 and a liquid application device 5 are successively arranged on the spreader rack 13 from the rear to the front.

Figure 2:
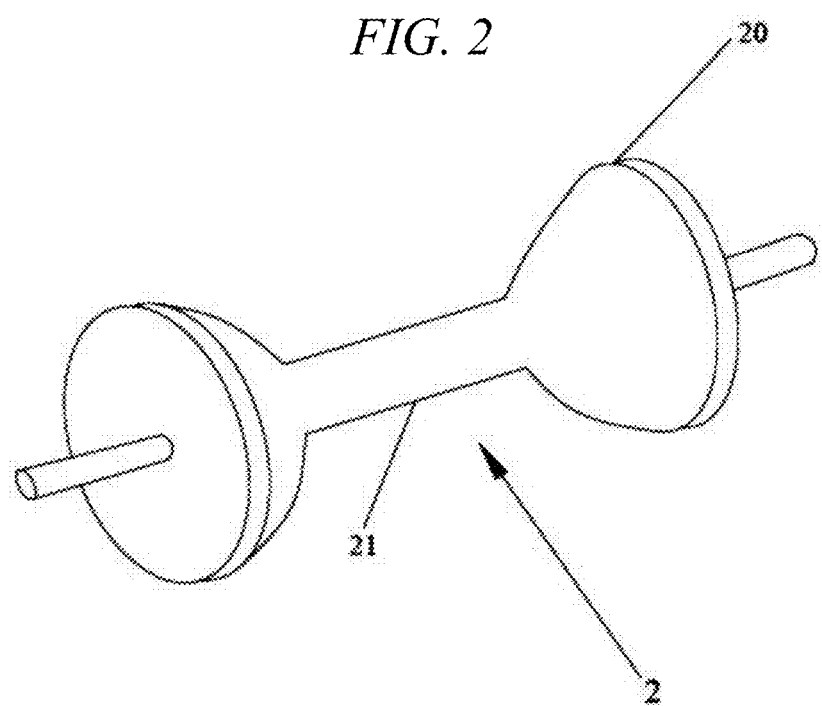
FIG. 2 is a schematic diagram of a ridger provided by the present invention.

As shown in FIG. 2, the ridger 2 includes two ridging wheels 20 and a ridging bar 21. A side of the ridging wheels 20 is formed into an arc-shaped convex surface. The two ridging wheels 20 are arranged on both ends of the ridging bar 21. The arc-shaped convex surface of the ridging wheels 20 is arranged on an inner side of the ridger 2.

The application device 3 includes a feeding track 31, a solid tank 32 and two spiral perforated drills 33. The two spiral perforated drills 33 are respectively arranged on both sides of the bottom of the spreader rack 13 and also in front of the ridger 2. The top of the spiral perforated drill 33 extends upward into the solid tank 32 from the bottom of the solid tank 32. The solid tank 32 is provided with a top opening. Both ends of the feeding track 31 are respectively arranged in the hopper 12 and the top opening of the solid tank 32.

Figure 3:
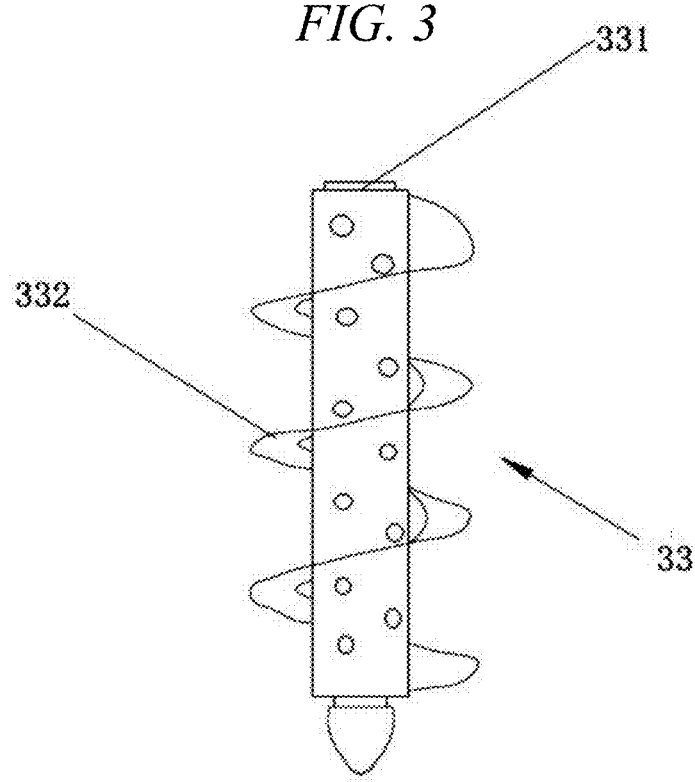
FIG. 3 is a schematic diagram of a spiral perforated drill provided by the present invention.

As shown in FIG. 3, the spiral perforated drill 33 includes a rotating tube 331 and a rotating convex wall 332. The rotating tube 331 is a hollow tube. The rotating convex wall 332 is spirally arranged along an outer wall of the rotating tube 331. A plurality of holes are spaced apart on a wall of the rotating tube 331.

The spiral perforated drill 33 performs deep plowing, rotary tillage and scarification of the soil on a ridge and applies a solid in the solid tank into deep soil.

Figure 4:
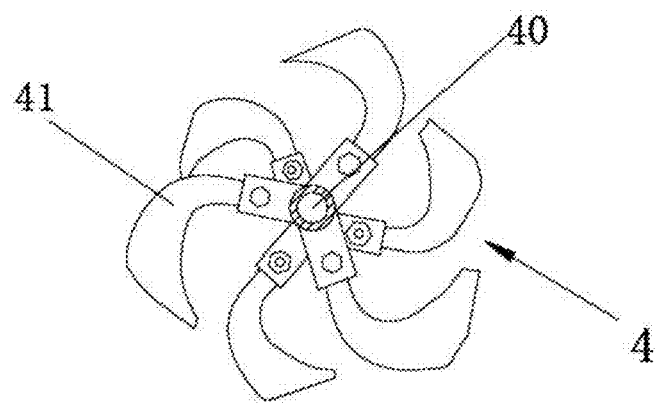
FIG. 4 is a schematic diagram of a rotary plow provided by the present invention.

As shown in FIG. 4, the rotary tillage wheel 4 includes a rotary rod 40 and a plurality of rotary tillage blades 41. A plurality of rotary tillage blades 41 are circumferentially spaced along the rotary rod 40.

The two rotary tillage wheels 4 are respectively arranged on double sides of the bottom of the spreader rack 13 and also in front of the two spiral perforated drills 33. The rotary tillage wheels 4 are suspended on the spreader rack 13 by a suspension arm 42. The space between the suspension arms 42 is adjustable, and the space is smaller than the breadth of the ridge.

The liquid application device 5 includes a liquid tank 51, a connecting pipe 52 and a nozzle 53. The nozzle 53 is arranged at the bottom of the spreader rack 13 and also between the spiral perforated drills 33 and the mulching device 6. The liquid tank 51 is located on the spreader rack 13 above the nozzle 53. Top and bottom ends of the connecting pipe 52 are respectively connected with the liquid tank 51 and the nozzle 53.

The solid tank 32 is used for storing a solid to be applied into deep soil, including an amendment, a conditioner, a chemical fertilizer and a granular straw fertilizer, etc. These solids are applied in large amounts, so the feeding track needs to be connected to the hopper. The liquid tank 51 is used to store a liquid to be sprayed on the ground, which is mainly a fungicide, a herbicide, an insecticide and a liquid fertilizer. These liquids are used in small amounts.

The mulching device 6 includes a mulch film clamping groove 61 and a mulch film pressing wheel 62. The mulch film clamping groove 61 is arranged at the bottom of the front end of the spreader rack 13. The mulch film pressing wheel 62 is arranged on a front end surface of the spreader rack 13.

The mulch film clamping groove 61 is used for hanging a whole roll of mulch film. The mulch film pressing wheel 62 is used for compacting an edge of the mulch film.

Example 2

Example 2 relates to an operation method of the soil conditioner spreader provided by Example 1. Before use, a solid conditioner is loaded into the hopper 12, a culture solution or an herbicide/insecticide is stored in the liquid tank 51, and a whole roll of mulch film is hanged on the mulch film clamping groove 61. The operation method includes the following steps:

Step S1: saline land is leveled.

Step S2: the spreader body 1 advances and the ridger 2 ridges; the parameters such as ridge height and breadth are adjusted as needed during ridging; a ridge plow wheel moves forward to cut the soil to form a ditch; the cut soil is turned inside along a wheel wall to form a ridge.

Step S3: the conditioner in the hopper 12 is transported to the solid tank 3 through the feeding track 31; the conditioner is discharged from the solid tank 3 to the spiral perforated drill 33; the spiral perforated drill 33 performs deep plowing, rotary tillage and scarification and applies the conditioner into the soil above the ridge.

Step S4: the height of the rotary tillage wheel 4 is adjusted by the suspension arm 42; the rotary tillage wheel 4 performs rotary tillage on the ridge, which mainly carries out rotary tillage of surface soil (within 10 cm of the ridge).

Step S5: a culture solution of a fungicide or an herbicide/insecticide stored in the liquid tank 51 is transported to the nozzle 53, and the nozzle 53 sprays the culture solution or the herbicide/insecticide to the surface of the soil on the ridge.

Step S6: a head of a whole roll of mulch film hanging on the mulch film clamping groove 61 is unfolded; the mulch film is laid along a ridge surface, and flattened horizontally by the mulch film pressing wheel 62 against the ground; the soil is scraped against an edge of the mulch film to fix the mulch film; the spreader body 1 advances so that the mulch film is gradually lowered, covering the ridge surface.

Although the present invention has been described in detail above with a general description and specific examples, some modifications or improvements can be made on the basis of the present invention, which is apparent to those skilled in the art. Therefore, these modifications or improvements made without departing from the spirit of the present invention all fall within the protection scope of the present invention.

What is claimed is:

1. An operation method of a soil conditioner spreader, the soil conditioner spreader comprising:
   a spreader body, the spreader body is provided with a hopper in a middle part; the hopper is used for storing a solid conditioner; the spreader body is provided with a spreader rack in a front part; the spreader rack is provided with a mulching device on a front end; a ridger, a solid application device, two rotary tillage wheels and a liquid application device are successively arranged on the spreader rack from the rear to the front;
   the solid application device comprises a feeding track, a solid tank and two spiral perforated drills; the two spiral perforated drills are respectively arranged on both sides of a bottom of the spreader rack and also in front of the ridger; the top of the spiral perforated drills extends upward into the solid tank from a bottom of the solid tank; the solid tank is provided with a top opening; both ends of the feeding track are respectively arranged in the hopper and the top opening of the solid tank;
   the two rotary tillage wheels are respectively arranged on both sides of the bottom of the spreader rack and also in front of the two spiral perforated drills;
   the liquid application device comprises a liquid tank, a connecting pipe and a nozzle; the nozzle is arranged at the bottom of the spreader rack and also between the spiral perforated drills and the mulching device; the liquid tank is located on the spreader rack above the nozzle; top and bottom ends of the connecting pipe are respectively connected with the liquid tank and the nozzle,
   wherein, the method comprising:
      leveling saline land;
      advancing the spreader body and ridging by the ridger;
      transporting the conditioner in the hopper to the solid tank through the feeding track;
      discharging the conditioner from the solid tank to the spiral perforated drill;
      performing, by the spiral perforated drill, deep plowing, rotary tillage and scarification, and applying the conditioner into the soil above a ridge;
      performing rotary tillage on the ridge by the rotary tillage wheel;
      transporting a culture solution of a fungicide or an herbicide/insecticide stored in the liquid tank to the nozzle, and spraying through the nozzle;
      unfolding a head of a whole roll of mulch film hanging on the mulch film clamping groove;
      laying the mulch film along a ridge surface;
      flattening the mulch film horizontally by the mulch film pressing wheel against the ground;
      scraping the soil against an edge of the mulch film to fix the mulch film; and
      advancing the spreader body so that the mulch film is gradually lowered, covering the ridge surface.

2. The operation method of the soil conditioner spreader according to claim 1, wherein:
   the ridger comprises two ridging wheels and a ridging bar; a side of the ridging wheels is formed into an arc-shaped convex surface; the two ridging wheels are arranged on both ends of the ridging bar; the arc-shaped convex surface of the ridging wheels is arranged on an inner side of the ridger.

3. The operation method of the soil conditioner spreader according to claim 1, wherein:
   the spiral perforated drill comprises a rotating tube and a rotating convex wall; the rotating tube is a hollow tube; the rotating convex wall is spirally arranged along an outer wall of the rotating tube; a plurality of holes are spaced apart on a wall of the rotating tube.

4. The operation method of the soil conditioner spreader according to claim 1, wherein:
   the rotary tillage wheel comprises a rotary rod and a plurality of rotary tillage blades; a plurality of rotary tillage blades are circumferentially spaced along the rotary rod; the rotary tillage wheel is suspended on the spreader rack by a suspension arm.

5. The operation method of the soil conditioner spreader according to claim 1, wherein:
   the mulching device comprises a mulch film clamping groove and a mulch film pressing wheel; the mulch film clamping groove is arranged at the bottom of the front end of the spreader rack; the mulch film pressing wheel is arranged on a front end surface of the spreader rack; the mulch film clamping groove is used for hanging a whole roll of mulch film; the mulch film pressing wheel is used for compacting an edge of the mulch film.

6. The operation method of the soil conditioner spreader according to claim 1, wherein the spreader body is provided with four wheels at the bottom and a cab in a rear part.

* * * * *